United States Patent [19]

Howard

[11] Patent Number: 4,915,962

[45] Date of Patent: Apr. 10, 1990

[54] CULINARY SEASONING COMPOSITION

[75] Inventor: Alan N. Howard, Cambridge, England

[73] Assignee: The Howard Foundation, Leeds, England

[21] Appl. No.: 224,546

[22] Filed: Jul. 25, 1988

Related U.S. Application Data

[63] Continuation-in-part of Ser. No. 844,574, Mar. 27, 1986, abandoned.

[30] Foreign Application Priority Data

Mar. 27, 1985 [GB] United Kingdom ................ 8507977

[51] Int. Cl.$^4$ ...................... A23L 1/237; A23L 1/304
[52] U.S. Cl. ...................... 426/74; 426/648; 426/649; 426/650
[58] Field of Search ................. 426/648, 649, 74, 650

[56] References Cited

U.S. PATENT DOCUMENTS

| | | | |
|---|---|---|---|
| 12,063 | 12/1892 | Weddell | 426/649 |
| 2,489,759 | 11/1949 | Dunn | 426/649 |
| 2,489,766 | 11/1949 | Dunn | 426/649 |
| 2,744,823 | 5/1956 | Diamond | 426/648 |
| 3,697,287 | 10/1972 | Winitz . | |
| 4,068,006 | 1/1978 | Moritz | 426/648 |
| 4,220,667 | 9/1980 | Jakinovich | 426/649 |
| 4,454,162 | 6/1984 | Schanze | 426/658 |

FOREIGN PATENT DOCUMENTS

86/05954 10/1986 World Int. Prop. O. .......... 426/649

Primary Examiner—Jeanette Hunter
Attorney, Agent, or Firm—Cushman, Darby & Cushman

[57] ABSTRACT

The invention provides a culinary seasoning composition. The composition comprises a saline component and a trace element component, the trace element component itself comprising at least one compound of a trace element selected from zinc, copper, manganese, chromium, selenium or molybdenum or a mixture of two or more such compounds. The composition is formulated such that a portion of from about 5 to about 15 grams of the composition contains at least a recommended daily dietary allowance of at least one of said trace elements.

The composition is prepared by dissolving the trace element component in a small amount of water, blending the solution with part of the saline component or with at least part of any diluent or a mixture thereof, and thereafter blending with the saline component or the remainder thereof.

19 Claims, No Drawings

CULINARY SEASONING COMPOSITION

This application is a continuation-in-part of Ser. No. 06/844,574 filed Mar. 27, 1986, now abandoned.

BACKGROUND OF THE INVENTION (a) Field of the Invention

The present invention relates to a culinary seasoning composition and, in particular, to compositions containing a "salty" substance such as sodium chloride, preferably mixed with potassium chloride, and one or more trace elements.

(b) Description of the Prior Art

In the past various proposals have been made for providing seasoning salt compositions which have the seasoning "saltiness" of common salt itself, but which contain less than 100% sodium chloride. Thus, for example, U.S. Pat. No. 2,742,366 describes a salt substitute comprising from 40 to 90% by weight of potassium chloride and up to 10% by weight of calcium chloride, together with from 5 to 50% by weight of a sugar e.g. various amounts of sucrose and/or dextrose, and up to 10% by weight of a glutamate. In such a composition "saltiness" is provided by the potassium chloride, while the bitter flavour of that compound is masked by the remaining ingredients. Similarly, British Specification No. 1,160,191 describes a culinary seasoning salt composition comprising from 20 to 80% by weight of potassium chloride and from 80 to 20% by weight of sodium chloride, which has a greater salty taste than sodium chloride alone, but in which the bitter taste of potassium chloride is at least partly masked by the sodium chloride. An example of a commercial composition comprising a mixture of sodium and potassium chlorides is that sold as "Seltin" and containing about 65% by weight of sodium chloride, about 25% by weight of potassium chloride and about 10% by weight of magnesium sulphate, together with a silicon dioxide anti-caking agent.

In addition, other proposals have been put forward to base compositions having a saline flavour on ammonium chloride or a glycinamide salt (see British Specification No. 1,531,349). The rationale behind all such proposals has been to provide a composition having a "saltiness" useful in seasoning applications, but which at the same time has a lowered or zero content of sodium chloride, whereby the daily consumption of that compound can be reduced, with consequent benefits to health.

Furthermore, various proposals have been put forward to provide common salt compositions which include a variety of other ingredients, for example, to enhance the free-flowing characteristics of the composition, to enhance its seasoning properties, to make it suitable for use in medicine, and for a number of other purposes. Thus, known additives besides potassium chloride comprise calcium salts, magnesium salts, ammonium salts, iodine compounds, phosphates, flavourings, flavour enhancers, colours, therapeutic compounds and vitamins. This is illustrated, for example, by British Specification No. 655,114, which describes mineral food supplements inter alia for addition to salt comprising:

from 14.4 to 28.8% of calcium,
from 12.4 to 26.6% of phosphorus, and
from 0.8 to 2.9% of iron, together with an edible filler such as starch. Another illustrative example is British Specification No. 694,597 which describes vitaminized salt comprising common salt coated with various B vitamins and vitamin C.

In addition, U.S. Pat. No. 2,744,823 describes the production of a dietary salt composition fortified with trace minerals. This specification is directed to producing a trace mineralized salt wherein the trace minerals are uniformly distributed throughout the product through the use of a non-toxic liquid polyhydric alcohol such as propylene glycol, which is used to coat salt crystals and to keep the small added amounts of finely powdered trace elements from segregating and dusting during production and subsequent use. The trace elements disclosed include cobalt, copper, iron, magnanese, zinc and iodine, and the claimed compositions include from 0.01% to 2.0% of said liquid polyhydric alcohol. However, there is no teaching of any requirement to control the percent by weight of salt or trace elements in the salt composition. Furthermore, the disclosed compositions are all based on sodium chloride alone as the saline component.

Also, U.S. Pat. No. 4,107,346 relates to a dietary salt composition which is described as a combination of salts of sodium, potassium, calcium and magnesium supplemented by suitable amounts of trace elements. The trace elements discussed are iron, iodine, copper, zinc, manganese, cobalt, molybdenum, selenium, chromium, nickel, tin, silicon, fluorine and vanadium. The specification teaches a formulation wherein the major elements (sodium, potassium, calcium, magnesium) must be present in the same ratio as they are in body fluids. Sodium and potassium are provided in the form of chlorides, while calcium and magnesium may be provided by the use of organic salts of glutamates, lactates, tartrates and gluconates. Thus, the specification discloses "salt" compositions utilizing sodium chloride in an amount of from 85 to 95%, potassium chloride in an amount of from 0.5 to 3%, calcium lactate in an amount of from 0.5 to 4% and magnesium gluconate in an amount of from 0.5 to 3.5%. The total amount of trace elements included in the formulation is generally described as less than 0.5% and the formulation is proportioned to supply at least about 20% of the recommended daily allowance of the trace elements included for each 10 gram portion of the "salt" composition. More specifically, it is said that a suggested supplementation would provide about ¼ to ½ of the estimated daily requirement of trace elements in 10 grams of the composition.

Furthermore, a variety of mineral, trace element and vitamin supplement compositions are known which seek to supply the minimum daily human requirement of such substances in an acceptable and assimilable form. However, where such supplement compositions contain sodium or potassium they contain those compounds in a proportion to the remaining minerals and/or trace elements whereby each of those compounds too are supplied in the minimum daily amount per unit dose of composition.

It is known, therefore, to provide seasoning compositions of various degrees of saltiness in which sodium chloride is employed as a carrier for other ingredients or other ingredients are employed to reduce the ill effects of sodium chloride when consumed in excess. It is also known to provide seasoning compositions supplemented with trace elements and to provide trace element supplements including sodium or potassium.

However, while a wide variety of sodium chloride-containing or other "salty" compositions have been proposed, while trace element supplement and like compositions are known, and while seasoning compositions including one or more trace elements are known, it has never before been proposed to employ a seasoning composition to supply one or more trace elements in a recommended daily dietary allowance.

OBJECTS OF THE INVENTION

A principal object of this invention is to provide useful and effective trace element supplementation of a human diet at a level of at least 100% of the recommended daily dietary allowance (RDA) as defined by the U.S. National Academy of Sciences.

Another object of the invention is to provide such supplementation by formulating a seasoning composition based on a saline component (to provide a "salty" taste) and a trace element component.

A further object of the invention is to provide a culinary seasoning composition which in a daily datum portion can provide 100% of the trace element RDA as defined by the U.S. National Academy of Sciences for zinc, copper, manganese, chromium, selenium and molybdenum.

Yet another object of the invention is to provide such a composition which also includes an effective and useful amount of one or more additional mineral elements and/or vitamins.

A still further object of the invention is to provide useful and effective trace element supplementation of a human diet at a level of at least 100% of the recommended daily dietary allowance (RDA) as defined by the U.S. National Academy of Sciences using a culinary seasoning composition as carrier while at the same time employing a saline component comprising 90% or less of sodium chloride.

These and other objects and advantages will become apparent from the following detailed description of this invention.

In accordance with the foregoing objects, this invention provides a culinary seasoning composition, which composition comprises a saline component and a trace element component, the trace element component comprising at least one compound of a trace element selected from zinc, copper, manganese, chromium, selenium or molybdenum or a mixture of two or more such compounds, and the composition being formulated [i.e. the salt and trace element components, together with other optional ingredients being in a weight ratio], such that a portion of from about 5 to about 15 grams of the composition contains at least a recommended daily dietary allowance of at least one of said trace elements.

DESCRIPTION OF THE INVENTION

The compositions of the invention are intended to provide a seasoning composition useful in domestic or industrial cooking or at the table, which at the same time affords a useful and effective trace element supplementation in the daily diet. I have found that provided the composition is formulated such that a recommended daily dietary allowance of at least one trace element is provided in a portion of from about 5 to about 15 grams, especially about 10 grams, of the composition, such useful and effective trace element supplementation can consistently be obtained without detriment from other factors.

In the compositions of the invention, the saline component may be any substance or composition which can provide a "salty" seasoning taste in cooking or at the table. Thus, the saline component may comprise sodium chloride, potassium chloride, ammonium chloride or a salt substitute such as a glycinamide salt e.g. a glycinamide hydrochloride, sulphate, glutamate, citrate, malate, adipate, tartrate, fumarate, phosphate or ascorbate, with those saline component compounds being formulated (as desired or convenient) with other ingredients in accordance with the varied list of additives known in the prior art, subject only to the requirements imposed by the trace element component and the weight ratios set out herein.

Preferably, however, the saline component comprises sodium chloride, potassium chloride or a mixture comprising sodium chloride and potassium chloride. In particular, the saline component preferably comprises from about 10 to about 90% by weight of sodium chloride and/or from about 90 to about 10% by weight of potassium chloride. More preferably, however, the saline component comprises from about 60 to about 75% by weight of sodium chloride, the balance being potassium chloride.

In addition, the composition may, as one preferred alternative, include an edible filler. In that case, the filler may be included in an amount of up to about five times the weight of saline component employed, e.g. sodium and/or potassium chloride, but more preferably in an amount of about 20 to about 50% by weight of the saline component, depending on the effect required. Where a filler is to be used, preferred fillers are carboxymethyl cellulose, an edible starch, an edible gum e.g. gum arabic, guar gum or Xanthan gum, gelatin, a sugar e.g. sucrose, glucose or lactose, or an alkaline earth phosphate e.g. disodium phosphate, magnesium monohydrogen phosphate or calcium monohydrogen phosphate.

Furthermore, besides the above-listed trace elements, the composition of the invention preferably includes at least one compound of calcium, magnesium, iron, iodine, fluorine or phosphorus to provide at least one additional mineral element. More preferably, the composition is one wherein a portion of from about 5 to about 15 grams of the composition contains at least a recommended daily dietary allowance of at least one of calcium, magnesium, iron, iodine, fluorine or phosphorus.

In formulating the composition of the invention, the preferred aim is to supply a recommended daily dietary allowance of one or more trace elements or additional mineral elements in the average dialy portion of seasoning composition consumed by human beings. In that respect, I have found that where the datum amount is below 5 grams problems arising out of toxic effects of the trace elements may be encountered. On the other hand, where the datum amount is above 15 grams the trace elements are supplied in amounts which can be ineffective. Thus, while the above broad range of from about 5 to about 15 grams we believe sets the broadest limits on the datum amount, nevertheless it is preferred that in the composition of the invention a recommended daily dietary allowance of any trace element or additional mineral element is provided relative to a portion of the composition in an amount of from about 8 to about 12 grams. More preferably, that daily allowance is provided relative to a portion in an amount of about 10 grams.

Also, where the composition is otherwise formulated such that it contains no sodium or potassium, or chlorine, it is preferred that any such missing element also should be provided in a recommended daily dietary allowance relative to the chosen portion of composition as defined above. Thus, the composition of the invention should preferably comprise at least essentially all of the following elements, namely:
Calcium
Phosphorus
Magnesium
Potassium
Sodium
Chlorine
Fluorine
Iodine
Iron
Zinc
Copper
Manganese
Selenium
Molybdenum
Chromium.

Nevertheless, because the main aim of the invention is to provide one or more of the said trace elements in a daily portion, and because certain readily-obtainable calcium, magnesium and phosphorus compounds such as monocalcium phosphate and magnesium oxide are water-insoluble, the daily allowance requirements of say calcium and phosphorus need not be met if the meeting of those requirements would provide a composition which is unacceptable to the consumer. Thus, for example, monocalcium phosphate and/or magnesium oxide preferably should not be included in a composition intended for use in domestic cooking, e.g. in cooking vegetables by boiling, or as a "table salt", because of the fact that both compounds leave an insoluble residue in cooking water and appear as a "snow" when sprinkled on food. Furthermore, while magnesium sulphate and magnesium chloride are readily obtainable as substitutes for magnesium oxide, because there is no such readily-obtainable substitute for monocalcium phosphate, it may be preferred to "sacrifice" calcium and phosphorus in order to produce a viable composition. However, for dough or pastry-making, or in industrial applications where such factors are not a consideration, such water-insoluble compounds may be included.

Up to the present time the authorities of various countries, as well as international bodies, have attempted to define in various ways the minimum daily human requirements of the above-listed trace elements and mineral elements. Thus, in some countries such as the U.K., there is a recommended daily dietary allowance (RDA) figure for certain of the listed elements, whereas for other elements no such U.K. RDA figure has so far been given. Furthermore, the RDA figure for any particular element can vary from country to country.

However, the National Academy of Sciences in the U.S.A. has sought to define a range of Adequate Daily Dietary Intake (ADDI) for each necessary element, and the figures given below are taken from "Recommended Dietary Allowances" Ninth Revised Edition, 1980, National Academy of Sciences Washington, D.C. Nevertheless, it is to be understood that where for any particular country an RDA figure is lower or higher, that figure may be adopted as necessary or desired.

Thus, for example, in the U.K. the only RDA figures given for the above-listed elements are as follows:
Calcium about 500 mg
Iron about 12 mg
Iodine about 140 mcg,
and the remaining elements are not assigned an "official" RDA. Nevertheless, preferred minimum levels taken from the U.S. ADDI ranges can be stated as follows:
Calcium about 800 mg
Phosphorus about 800 mg
Magnesium about 300 mg, for example, about 300 to about 400 mg, typically about 350 mg
Iron about 18 mg
Iodine about 150 mcg
Fluorine about 1.5 mg, for example, about 1.5 to about 4.0 mg
Zinc about 15.0 mg
Copper about 2.0 mg, for example, about 2.0 to about 3.0 mg
Magnanese about 2.5 mg, for example, about 2.5 to about 5.0 mg, typically about 4 mg
Selenium about 500 mcg, for example, about 50 to about 200 mcg, typically about 60 mcg
Chromium about 50 mcg, for example, about 50 to about 200 mcg, typically about 60 mcg
Molybdenum about 150 mcg, for example, about 150 to about 500 mcg Accordingly, the composition of the invention preferably includes at least one trace element, optionally together with at least one additional mineral element, at least in a recommended daily dietary allowance as defined above per an about 5 to about 15 gram portion of composition. Furthermore, all of potassium, sodium and chlorine should preferably be supplied in a said daily portion of composition in at least an amount within the ADDI range, namely:
Potassium about 1875 to about 5625 mg
Sodium about 1100 to about 3300 mg
Chlorine about 1700 to about 5100 mg
and typically in an amount of at least:
Potassium about 2.0 g
Sodium about 1.5 g
Chlorine about 1.8 g.

While the basic ingredients of the composition are as set out above, the composition may also include a variety of other ingredients. In particular, the composition may include one or more of the following:

1. Bitterness-reducing agents, especially where potassium chloride is employed as the saline component or as part of that component. As examples of such agents, there may be mentioned yeasts, autolysed yeasts, and organic acids and their salts e.g. tartaric, succinic, citric, adipic, aspartic, lactic, and malic acids and their sodium, potassium, calcium and magnesium salts. However, a preferred agent is Talin (registered Trade Mark) protein (or Thanumatin), an intensely sweet, natural protein extracted from the fruit of the West African plant *Thaumatococcus danielli.*

2. Flavours, for example, onion juice, garlic or celery.

3. Flavour enhancers, for example, a glutamate e.g. monosodium, potassium or calcium glutamate, or a nucleotide e.g. guanylic, inosinic or adenosinic acid or a salt thereof.

4. Anti-caking agents, for example, a sodium, aluminium silicate, a zirconium salt, tricalcium phosphate, magnesium carbonate, an insoluble metallic stearate e.g. calcium or magnesium stearate, rice starch, anhydrous sodium sulphate or silicon dioxide.

Furthermore, the composition may include one or more vitamins, which again may be included on the same or similar preferred basis as the above-mentioned elements, namely in terms of a recommended daily dietary allowance. More preferably vitamins may be included in amounts in excess of their RDA, with preferred levels per daily portion being as follows:

| Vitamins | Percentage U.K. RDA |
|---|---|
| Vitamin A about 1.0 mg | 133 |
| Vitamin $B_1$ about 1.5 mg | 125 |
| Vitamin $B_2$ about 1.7 mg | 106 |
| Niacin about 19.0 mg | 106 |
| Vitamin $B_6$ about 2.2 mg | * |
| Pantothenic Acid about 7.0 mg | * |
| Biotin about 200.0 mcg | * |
| Folic Acid about 400.0 mcg | 133 |
| Vitamin $B_{12}$ about 3.0. mcg | 150 |
| Vitamin C about 60.0 mg | 200 |
| Vitamin $D_3$ about 10.0 mcg | 400 |
| Vitamin E about 10.0 mg | * |
| Vitamin K about 140.0 mcg | * |

(*No U.K. RDA - figure within ADDI range).

In the foregoing description, magnesium is mentioned as part of an optional mineral element content, or as part of other optional ingredients. Furthermore, when present as such, and especially when present to meet the preferred requirement of including from about 300 to about 400 mg of magnesium in say about 10 grams of composition, a magnesium salt such as magnesium sulphate would need to be employed in an amount of from about 15 to about 20% by weight of the composition. Nevertheless, in another preferred embodiment a magnesium salt may be included in significantly smaller amounts of up to say about 10% by weight, in particular when employed as diluent to a saline component of the "Seltin" type mentioned above. Thus, in that other preferred embodiment the saline component and diluent together may, for example, comprise:
about 65% by weight of sodium chloride,
about 25% by weight of potassium chloride, and
about 10% by weight of magnesium chloride or sulphate.

The composition of the invention may be prepared by any method which affords an intimate mixture of saline component and trace element component, with each component being essentially homogeneously distributed throughout the composition. Thus, for example, the composition may be prepared, if desired, by a method using a polyhydric alcohol as described in U.S. Specification No. 2,744,823 or by the dry or wet methods, the latter followed by spray or freeze drying, or the like as described in U.S. Specification No. 4,107,346, which are incorporated herein by way of reference.

Preferably, however, the composition is prepared by a method in which the ingredients are brought together in a particular manner, that is to say by first dissolving at least part of a trace element component in a small amount of water, blending the solution with part of the saline component or with at least part of any diluent or filler or a mixture thereof, and thereafter blending with the saline component or the remainder thereof and any remaining ingredients. Furthermore, so as to avoid discolouration by reaction between certain ingredients, in particular potassium iodide and trace element compounds, I have found that a composition at least essentially free from discolouration can be prepared by a method in which the potassium iodide and at least some of the trace element component are each separately dissolved in a small amount of water, blended e.g. as by granulation, with some of the saline component and/or diluent or filler, and then blended with the remainder.

Accordingly, the present invention also provides a method of preparing a culinary seasoning composition in accordance with the invention, which method is as defined above, in particular one which comprises dissolving any potassium iodide and at least part of the trace element component separately in a small amount of water, mixing each separately with part of the saline component or with at least part of any diluent or filler or a mixture thereof, drying each mixture as necessary, and thereafter blending each with the saline component or the remainder thereof, together with any remaining or other desired ingredients. Preferably, in any such method any iron compound is included at the stage of the final blending.

In preferred embodiments of the above method the following alternative procedures may be employed:

Procedure I

1. Dissolve potassium iodide in water and blend e.g. granulate, with part of any diluent or filler to be used e.g. magnesium sulphate or magnesium chloride, for example, using from about 5 to about 10% by weight of the total diluent;
2. Dissolve trace element compounds in water and blend e.g. granulate, with remainder of diluent or filler;
3. Dry blends of steps 1 and 2; and
4. Mix dry blends of steps 1 and 2 with iron compounds and saline component, premixed if desired.

Procedure II

1. Blend saline component and any diluent or filler such as magnesium sulphate or magnesium chloride;
2. Mix a small portion of the blend of step 1, for example, from 5 to 10% by weight of the total, with a solution of potassium iodide in water;
3. Mix small portions of the blend of step 1, for example, from 5 to 10% by weight of the total, each separately with a solution of a chromium, molybdenum or selenium compound in water;
4. Dry the blends of steps 2 and 3;
5. Mix the remainder of the blend of step 1 with any iron, zinc, copper or manganese compounds; and
6. Mix together the blends of steps 2, 3 and 5.

In procedure II above the mixing of step 3 may be accomplished, if desired, using a single solution including compounds of each of chromium, molybdenum and selenium. Also, in the method of the invention as illustrated by the above procedures any suitable drying may be effected as desired or necessary, for example, at a temperature of from about 40° to about 70° C. for times of from about 15 minutes to about 1½ hours. In addition, mixing or blending may be accomplished as necessary or desired by granulation where appropriate and/or by the use of mixing or milling equipment. Furthermore, the water used to dissolve potassium iodide etc. preferably should be de-ionised water or other purified water essentially free from contaminating ions.

DESCRIPTION OF THE PREFERRED EMBODIMENTS

Following is a description by way of example only of specific compositions in accordance with the invention, and their preparation.

EXAMPLE 1

A composition suitable for use as a table salt was produced according to the following formulation:

| Ingredient | Amount in grams |
| --- | --- |
| Sodium chloride | 650.0 |
| Potassium chloride | 250.0 |
| Magnesium sulphate (ex. sicc.) | 75.0 |
| Ferrous sulphate (dried) | 6.0 |
| Zinc sulphate, $7H_2O$ | 6.6 |
| Copper sulphate (anhydrous) | .750 |
| Manganese sulphate, $4H_2O$ | 1.620 |
| Chromic chloride, $6H_2O$ | 0.064 |
| Sodium selenite | 0.027 |
| Sodium molybdate, $2H_2O$ | 0.063 |
| Potassium iodide | 0.0196 |
| Total | 990.1436 |

The composition was prepared by a procedure involving the following method steps, namely:

(1) The potassium iodide was dissolved in 1 cm³ of deionised water.

(2) 5 grams of the magnesium sulphate were granulated with the solution from step 1 and, once the mixture had "set", sized through a No. 20 screen.

(3) The zinc sulphate, copper sulphate, manganese sulphate, chromic chloride, sodium selenite and sodium molybdate were dissolved in 30 cm³ of de-ionised water.

(4) The solution from step 3 was then used to granulate the remaining 70 grams of magnesium sulphate. Once the mixture had "set" it was sized through a No. 20 screen.

(5) The granulates from step 2 and step 4 were dried from about ½ hour at about 50° C. before blending in the remaining sodium chloride, potassium chloride and ferrous sulphate.

The above procedure produced quite a good "salt", with only very small amounts of discolouration.

EXAMPLE 2

The composition described in Example 1 was prepared by an alternative and preferred procedure involving the following method steps for a batch of 1 kg, namely:

(1) The sodium chloride, potassium chloride and magnesium sulphate were mixed together and sieved through a No. 20 screen.

(2) To 100 grams of the mixture from step 1 was added a solution of 0.0196 grams of potassium iodide in 10 cm³ of de-ionised water and the whole mixed using a pestle and mortar.

(3) The mixture from step 2 was dried at about 60° C. for about one hour and then sized through a No. 20 screen.

(4) The procedure of steps 2 and 3 was repeated using 100 gram portions of the mixture from step 1 for each of the following solutions in turn:
0.064 grams of chromic chloride in 10 cm³ of de-ionised water,
0.063 grams of sodium molybdate in 10 cm³ of de-ionised water,
0.027 grams of sodium selenite in 10 cm³ of de-ionised water.

(5) To the remainder from step 1 the ferrous sulphate, zinc sulphate, copper sulphate and manganese sulphate powder were sieved in, with the fractions from steps 2, 3 and 4, through a No. 20 screen and mixed.

This preferred procedure produced excellent results in the form of a good "salt" with no discolouration.

EXAMPLE 3

A composition suitable for use as a table salt was produced according to the following formulation:

| Ingredient | Amount in grams |
| --- | --- |
| Sodium chloride | 650.0 |
| Potassium chloride | 190.0 |
| Magnesium sulphate (ex. sicc.) | 160.0 |
| Ferrous sulphate (dried) | 6.0 |
| Zinc sulphate, $7H_2O$ | 6.6 |
| Copper sulphate (anhydrous) | 0.750 |
| Manganese sulphate, $4H_2O$ | 1.62 |
| Chromic chloride, $8H_2O$ | 0.64 |
| Sodium selenite | 0.027 |
| Sodium molybdate, $2H_2O$ | 0.063 |
| Potassium iodide | 0.0196 |
| Total | 1015.1436 |

The composition was prepared by a procedure involving the method steps set out in Example 2. That procedure again produced a good "salt" with no discolouration.

EXAMPLE 4

The composition described in Example 3 was prepared by another alternative and preferred procedure by the following method steps, namely:

(1) The sodium chloride, potassium chloride and magnesium sulphate were mixed together and sieved through a No. 20 screen.

(2) Two solutions were prepared:
(a) 0.0196 grams of potassium iodide made up to 10 cm³ with de-ionised water.
(b) 0.027 grams of sodium selenite, 0.064 grams of chromic chloride, 0.083 grams of sodium molybdate, made up to 10 cm³ with de-ionised water.

(3) 100 grams of the mix from step 1 were mixed with solution (a) using a clean dry planetary mixer on medium speed, and then dried at about 60° C. for about one hour.

(4) 300 grams of the mix from step 1 were mixed with solution (b) diluted with 20 cm³ of de-ionised water to 30 cm³, using a clean dry planetary mixer on medium speed, and then dried at about 60° C. for about 1 hour.

(5) The fractions from steps 3 and 4 were then Fitz-milled through a 2 mm screen, with the knives forward, at medium speed.

(6) The remainder from step 1 and the ferrous sulphate, zinc sulphate, copper sulphate and manganese sulphate were sieved in through a No. 20 screen and the mixture cube blended.

This other alternative and preferred procedure produced an excellent "salt" which was much easier to prepare than by other procedures and which also was free from discolouration. In addition, the "salt" was even resistant to discolouration when left exposed, although protection from moisture is advisable.

EXAMPLE 5

A composition suitable for use as a table salt is produced according to the following formulation:

| Ingredient | Amount |
| --- | --- |
| Sodium chloride | 70 g |
| Magnesium sulphate (anhydrous) | 20 g |

-continued

| Ingredient | Amount |
| --- | --- |
| Ferrous Fumarate | 550 mg |
| Zinc sulphate, 7H₂O | 660 mg |
| Copper sulphate (anhydrous) | 75 mg |
| Manganese sulphate | 162 mg |
| Chromic chloride, 6H₂O | 6.4 mg |
| Sodium selenite | 2.7 mg |
| Sodium molybdate, 2H₂O | 6.3 mg |
| Potassium iodide | 1.96 mg |
| Silica | 0.5 g |
| Rice starch balance to | 100 g |

The composition is prepared by any one of the procedures of Examples 1 to 4, with the rice starch being added with the sodium chloride and/or magnesium sulphate.

EXAMPLE 6

A composition suitable for use as a table salt is produced according to the following formulation:

| Ingredient | Amount |
| --- | --- |
| Potassium chloride | 75 g |
| Magnesium sulphate (anhydrous) | 20 g |
| Ferrous fumarate | 550 mg |
| Zinc sulphate, 7H₂O | 660 mg |
| Copper sulphate (anhydrous) | 75 mg |
| Manganese sulphate | 162 mg |
| Chromic chloride, 6H₂O | 6.4 mg |
| Sodium selenite | 2.7 mg |
| Sodium molybdate, 2H₂O | 6.3 mg |
| Potassium iodide | 1.96 mg |
| Talin | 0.10 mg |

The composition is prepared by any one of the procedures of Examples 1 to 4, with the Talin being included in the or one of the trace element solutions.

EXAMPLE 7

A composition suitable for use as a table salt is produced according to the following formulation:

| Ingredient | Amount |
| --- | --- |
| Sodium chloride | 65 g |
| Potassium chloride | 25 g |
| Magnesium sulphate (anhydrous) | 10 g |
| Ferrous fumarate | 550 mg |
| Zinc sulphate, 7H₂O | 660 mg |
| Copper sulphate (anhydrous) | 75 mg |
| Manganese sulphate | 162 mg |
| Chromic chloride, 6H₂O | 6.4 mg |
| Sodium selenite | 2.7 mg |
| Sodium molybdate, 2H₂O | 6.3 mg |
| Potassium iodide | 1.96 mg |

The composition is prepared by any one of the procedures of Examples 1 to 4.

EXAMPLE 8

A composition suitable for use as a table salt is produced according to the formulation of Example 7 with the addition of the following vitamin ingredients:

| Ingredient | Amount |
| --- | --- |
| Vitamin A | 10 mg |
| Vitamin B₁ | 15 mg |
| Vitamin B₂ | 17 mg |
| Niacin | 190 mg |
| Vitamin B₆ | 22 mg |

-continued

| Ingredient | Amount |
| --- | --- |
| Pantothenic Acid | 70 mg |
| Biotin | 2 mg |
| Folic Acid | 4 mg |
| Vitamin B₁₂ | 30 mcg |
| Vitamin C | 600 mg |
| Vitamin D₃ | 100 mcg |
| Vitamin E | 100 mg |
| Vitamin K | 1.4 mg |

EXAMPLE 9

A composition suitable for use as a table salt is produced according to the formulation of Example 7 or the formulation of Example 8 with the addition of about 33 mg of anhydrous sodium fluoride.

EXAMPLE 10

A composition suitable for use in domestic cooking is produced according to the following formulation:

| Ingredient | Amount |
| --- | --- |
| Sodium chloride | 10 g |
| Potassium chloride | 50 g |
| Ammonium chloride | 5 g |
| Magnesium sulphate (anhydrous) | 10 g |
| Ferrous fumarate | 550 mg |
| Zinc sulphate | 660 mg |
| Copper sulphate (anhydrous) | 75 mg |
| Manganese sulphate | 162 mg |
| Chromic chloride, 6H₂O | 6.4 mg |
| Sodium selenite | 2.7 mg |
| Sodium molybdate, 2H₂O | 6.3 mg |
| Potassium iodide | 1.96 mg |
| Mono sodium glutamate | 2 g |
| Adipic acid | 2 g |
| Silica | 0.5 g |
| Sucrose balance to | 100.00 g |

The composition is prepared by any one of the procedures of Examples 1 to 4, with the monosodium glutamate, the adipic acid, the silica and the sucrose being added with the sodium and/or potassium and/or ammonium chloride.

EXAMPLE 11

Using each of the formulations of Examples 1 to 10 above similar compositions are produced by substituting magnesium chloride for magnesium sulphate and/or zinc chloride for zinc sulphate.

EXAMPLE 12

A composition suitable for use in industrial cooking, for example, in dough or pastrymaking, is produced according to the following formulation:

| Ingredient | Amount |
| --- | --- |
| Sodium chloride | 50 g |
| Potassium chloride | 19 g |
| Magnesium oxide | 6.6 g |
| Ferrous fumarate | 550 mg |
| Zinc oxide | 186 mg |
| Copper sulphate (anhydrous) | 75 mg |
| Manganese sulphate | 162 mg |
| Chromic chloride, 6H₂O | 6.4 mg |
| Sodium selenite | 2.7 mg |
| Sodium molybdate, 2H₂O | 6.3 mg |
| Potassium iodide | 1.96 mg |
| Mono calcium phosphate balance to | 100.00 g |

The composition is prepared by any one of the procedures of Examples 1 to 4, with the mono calcium phosphate being added with the sodium chloride and/or potassium chloride.

EXAMPLE 13

A composition suitable for use as a table salt at a serving size of 5 g per day is produced according to the following formulation:

| Ingredient | Amount |
| --- | --- |
| Sodium chloride | 78 g |
| Potassium chloride | 10 g |
| Magnesium sulphate (anhydrous) | 10 g |
| Ferrous sulphate (anhydrous) | 304 mg |
| Zinc sulphate, 7H$_2$O | 1.32 g |
| Manganese sulphate | 324 mg |
| Potassium iodide | 3.92 mg |
| Chromic chloride, 5H$_2$O | 12.8 mg |
| Copper sulphate (anhydrous) | 150 mg |
| Mono calcium phosphate balance to | 100 g |

It is of course to be understood that the invention is not limited to the details of the above specific Examples and that numerous variations of ingredients and in preparative procedure may be employed within the spirit and scope of the following claim.

I claim:

1. A culinary seasoning composition, which composition comprises:
    (a) a saline component, said saline component comprising sodium chloride or from about 10 to about 90% by weight of sodium chloride, the balance of said saline component comprising potassium chloride; and
    (b) a trace element component of the group of zinc, copper, manganese, chromium, selenium, molybdenum or a mixture thereof,
the composition being formulated such that a portion of from about 5 to about 15 grams of the composition contains in said portion at least:
    about 15 mg of zinc,
    from about 2.0 to about 3.0 mg of copper,
    from about 2.5 to about 5.0 mg of manganese,
    at least about 50 mcg of chromium,
    at least about 50 mcg of selenium, and
    at least about 150 mcg of molybdenum.

2. A composition according claim 1, wherein potassium, sodium and chlorine are supplied in an amount sufficient to provide the RDA as defined by the U.S. National Academy of Sciences.

3. A composition according to claim 1, which further includes up to 10% by weight of a magnesium compound.

4. A composition according to claim 1, which further includes an edible filler.

5. A composition according to claim 1, wherein said portion of from about 5 to about 15 grams of the composition contains at least the recommended daily dietary allowance of at least one of calcium, magnesium, iron, iodine, fluorine or phosphorus.

6. A composition according to claim 1, which includes one or more bitterness-reducing agents, flavors, flavor enhancers or anti-caking agents.

7. A composition according to claim 1, wherein said recommended daily dietary allowance is provided in a portion of the composition of from about 8 to about 12 grams.

8. A composition according to claim 1, which contains each of said trace elements in an amount of at least the RDA.

9. A composition according to claim 8, which further contains at least the RDA of each of the elements calcium, magnesium, iron, iodine, fluorine and phosphorus.

10. A composition according to claim 8, which includes in said portion of from about 5 to about 15 grams at least:
    about 15 mg of zinc,
    about 2.0 mg of copper,
    about 2.5 mg of manganese,
    about 50 mcg of chromium,
    about 50 mcg of selenium, and
    about 150 mcg of molybdenum; or mixtures thereof.

11. A composition according to claim 10, which further includes in said portion of from about 5 to about 15 grams of the composition at least:
    about 800 mg of calcium,
    about 300 mg of magnesium,
    about 18 mg of iron,
    about 150 mcg of iodine,
    about 1.5 mg of fluorine, and
    about 800 mg of phosphorus; or mixtures thereof.

12. A composition according to claim 1, which includes in said portion of from about 5 to about 15 grams at least about 15 mg of zinc,
    from about 2.0 to about 3.0 mg of copper,
    from about 2.5 to about 5.0 mg of manganese,
    from about 50 to about 200 mcg of chromium,
    from about 50 to about 200 mcg of selenium, and
    from about 150 to about 500 mcg of molybdenum; or mixtures thereof.

13. A composition according to claim 12, which further includes in said portion about 5 to about 15 grams of the composition at least:
    about 800 mg of calcium,
    about 300 mg of magnesium,
    about 18 mg of iron,
    about 150 mcg of iodine,
    about 1.5 mg of fluorine, and
    about 800 mg of phosphorus; or mixtures thereof.

14. A composition according to claim 1, which includes at least essentially all of the vitamins required by man in at least a recommended daily dietary allowance in a from about 5 to about 15 gram portion of the composition.

15. A culinary seasoning composition, which composition comprises:
    (a) a saline component, said saline component comprising sodium chloride or from about 10 to about 90% by weight of sodium chloride, the balance of said saline component comprising potassium chloride; and
    (b) a trace element component of the group of zinc, copper, manganese, chromium, selenium, molybdenum or a mixture thereof,
the composition being formulated such that a portion of about 10 grams of the composition contains in said portion at least:
    about 15 mg of zinc,
    from about 2.0 to about 3.0 mg of copper,
    from about 2.5 to about 5.0 mg of manganese,
    at least about 50 mcg of chromium,
    at least about 50 mcg of selenium, and at least about 150 mcg of molybdenum.

16. A composition according to claim 15, which includes in said portion of about 10 grams
at least about 15 mg of zinc,
from about 2.0 to about 3.0 mg of copper,
from about 2.5 to about 5.0 mg of manganese,
from about 50 to about 200 mcg of chromium,
from about 50 to about 200 mcg of selenium, and
from about 150 to about 500 mcg of molybdenum; or mixtures thereof.

17. A composition according to claim 16, which further contains at least the RDA of each of the elements calcium, magnesium, iron, iodine, fluorine and phosphorus.

18. A culinary seasoning composition, which composition comprises a saline component and a trace element component, the saline component comprising sodium chloride or from about 10 to about 90% by weight of sodium chloride and from about 90 to 10% by weight of potassium chloride and the trace element component comprising at least one compound of a trace element selected from zinc, copper, maganese, chromium, selenium or molybdenum or a mixture of two or more such compounds, the composition being formulated such that a portion of from about 5 to 15 grams of the composition contains a recommended daily dietary allowance of at least one of said trace elements based on the following daily dietary allowance amounts:
about 15 mg of zinc,
from about 2.0 to about 3.0 mg of copper,
from about 2.5 to about 5.0 mg of manganese,
at least about 50 mcg of chromium,
at least about 50 mcg of selenium, and
at least about 150 mcg of molybdenum.

19. A composition according to claim 18, which includes in said portion of from about 5 to 15 grams:
about 15 mg of zinc,
from about 2.0 to about 3.0 mg of copper,
from about 2.5 to about 5.0 mg of manganese,
from about 50 to about 200 mcg of chromium,
from about 50 to about 200 mcg of selenium, and
from about 150 to about 500 mcg of molybdenum.

* * * * *